July 4, 1961     K. G. BROWN     2,990,974
ARTICLE DISPENSING MEANS

Filed June 10, 1958     2 Sheets-Sheet 1

INVENTOR.
KENNETH G. BROWN
BY *James P. Malone*
ATTORNEY.

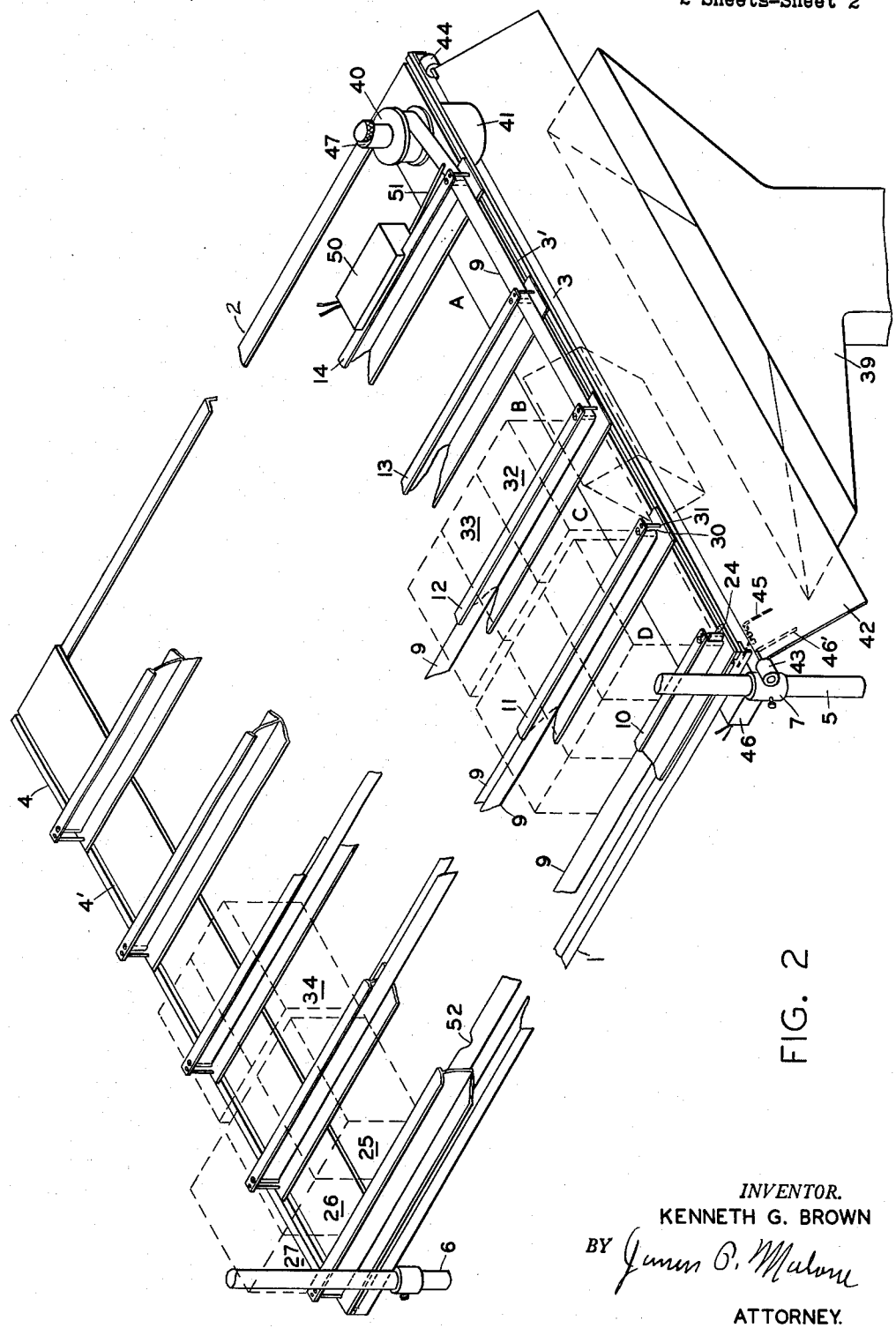

United States Patent Office 2,990,974
Patented July 4, 1961

2,990,974
ARTICLE DISPENSING MEANS
Kenneth G. Brown, Wickham Ave., Mattituck, N.Y.
Filed June 10, 1958, Ser. No. 741,025
2 Claims. (Cl. 221—103)

This invention relates to article dispensing means and more particularly to such means for dispensing refrigerated articles or boxes.

Conventional dispensing techniques are generally not suitable for dispensing or handling articles under low temperature conditions since these conditions cause icing and greatly impede moving mechanical parts. The icing tends to make moving mechanical parts stick together especially those using reciprocating motion. Also, necessary defrosting at regular intervals causes high humidity which results in corrosion and deterioration of moving parts. Therefore, complicated mechanical motions required for lifting fingers, sliding members, or spring loaded members, such as solenoids and clutches are generally not suited for low temperature and high humidity conditions. Sticking together of parts causes high torque starting and results in motor failure or breakage of connecting parts. These conditions are compounded when the machine is not continuously operating, for instance, in vending machines where there are liable to be long periods between uses.

The present invention provides article dispensing means, for instance, for vending machines suitable for operating under low temperature and high humidity conditions. Moving parts have been reduced to a minimum and all reciprocating motion parts have been eliminated. Also, all spring loaded parts such as fingers or gates or solenoids and spring loaded clutches have also been eliminated.

The present invention comprises a plurality of guide rails which are mounted in parallel position on a frame. The rails may be adjustably spaced to accommodate different size articles or boxes. The articles are moved by means of a plastic, metal, or other equivalent tape which is anchored at one end and which extends along the rails and around the articles between the rails. The rail ends that come in contact with the tape are rounded by a stationary round pin member fastened in place. The contact points provide a differential friction which is useful. Therefore, the tape extends around several parallel rows of articles in succession, and the free end of the tape is connected to a motor driven spool. When the tape is motor driven, articles in the row nearest the motor end of the tape will be moved forward and the end articles of the tape will drop off into an output chute individually. As the article falls it hits a cutoff plate which disconnects the motor circuit to deliver one package at a time. Due to the number of friction bend points on the tape, as will be discussed hereafter, the first row will be completely exhausted of articles before any articles are delivered from the second row. No gates or restraining fingers are necessary to hold the second row while the first row is being delivered.

Accordingly, a principal object of the invention is to provide new and improved dispensing means for articles.

Another object of the invention is to provide new and improved means for articles under refrigeration.

Another object of the invention is to provide new and improved dispensing means for articles under refrigeration and high humidity conditions.

Another object of the invention is to provide new and improved article dispensing means with a minimum of moving mechanical parts.

Another object of the invention is to provide new and improved article dispensing means having a minimum of moving parts having reciprocating motion.

Another object of the invention is to provide means for vending articles under refrigeration such as boxes of ice cream.

These and other objects of the invention will be apparent from the following specification and drawings, of which:

FIGURE 2 is a perspective view of an embodiment of the invention.

Figure 3:
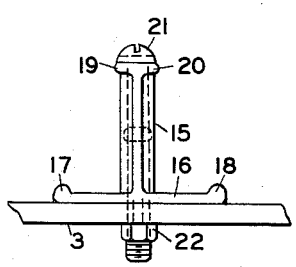
Figure 4:
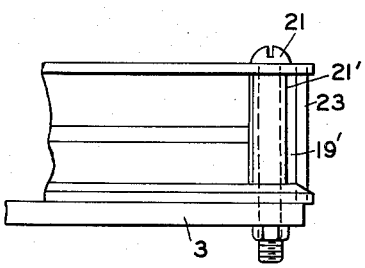
Figure 6:
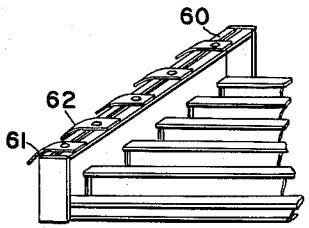

FIGURES 3, 4, and 6 are detail views of the embodiment of FIGURE 2, and

Figure 5:
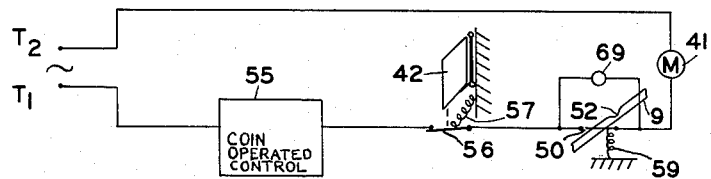

FIGURE 5 is a schematic circuit diagram for the embodiment of FIGURE 2.

Referring to the figures the invention comprises a rectangular frame having side members 1 and 2 and front and back members 3 and 4. The frame is mounted on vertical standards or pipes 5 and 6 so that a number of frames may be mounted one above the other. The frames may be connected to the standards with adjustable brackets 7 so that the vertical spacing may be adjusted to accommodate different size articles.

A plurality of parallel rails 10, 11, 12, 13, and 14 are mounted on the front and back members 3 and 4. The front and back members have slots 3' and 4' so that the rails may be fastened to the front and back members with adjustable spacing to accommodate different size articles.

FIGURES 3 and 4 show detail views of the rail construction. The rails may be of extruded aluminum and have a general inverted T-shape, the horizontal portion 16 being on the bottom. The ends of the horizontal member have raised portions 17 and 18 to provide low friction contact with the bottoms of the articles. The upper ends of the vertical member 15 also have raised portions 19 and 20 to provide low friction contact with the sides of the articles. At the end of each rail is inserted a vertical spacer 21' to accommodate a screw 21 which passes through the rail and the slot, for instance, slot 3'. The rail is then clamped to the member 3 by means of the nut 22 fastened to the other end of the screw.

The end of the rail adjacent the screw hole is rounded off by spacer 21' since this point comes in contact with the tape as will be described. Past the end of the rail is mounted a guide pin 23 spaced from the rail end to provide a space 19' for accommodating the tape. The tape 9 is anchored at one end to the frame, for instance, around the guide pin 24 at the end of the rail 10, FIGURE 2. The tape then extends along the inside of the rail 10 around the boxes 25, 26, 27, then forwardly between these boxes and the rail 11, then through the space 30 between the end of rail 11 and pin 31, then around the boxes 32, 33, 34, and so forth, then forwardly down between the other side of these boxes and the rail 12. Since there are no articles shown in the channels A and B between the rails 12, 13 and 13, 14, the tape then extends directly across the front of these channels onto the spool 40 which is connected to be motor driven by the motor 41. If there were articles in the channels A and B, the tape would extend around those articles in the same manner as described in connection with the channels C and D.

All of the channels are open at the forward end so that an article falling out the forward end of any channel will fall down striking the large delivery plate 42 and then fall into the output chute 39. The delivery plate is pivotally mounted to the frame by means of the bearings 43 and 44 and is spring loaded in a position slightly below the horizontal, as shown in FIGURE 2, by spring 45. When an article strikes the delivery plate 42 the plate is deflected down against the spring pressure and activates the arm 46' of a micro switch 46 which is connected to turn off the motor 41. A clutch 47 connects the motor shaft and the spool 40. This clutch may be a key pin device which connects keyed portions of the motor shaft and the spool. The clutch is not used during the operation. It is only used to disconnect the spool when loading the machine.

The showing of FIGURE 2 only shows one rack. There may be any number of racks stacked with suitable vertical spacing on the standards 5 and 6. The racks are made with the maximum spacing between all parts for providing the maximum ventilation of the articles for proper refrigeration.

Figure 1:
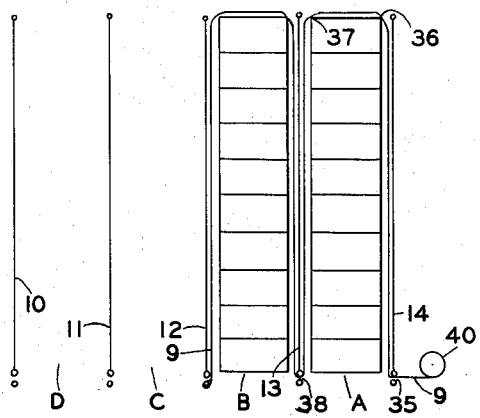
FIGURES 1 and 7 are diagrams illustrative of the operation of embodiments of the invention.

The operation of the device is as follows: Referring to FIGURE 1 the rack is shown with the channels A and B loaded with articles and the channels C and D not being used. The tape 9 is anchored in the end of the rail 12 and extends around the articles in channel B and around the articles in channel A, the other end of the tape being connected to the motor driven spool 40. When the motor is actuated, the spool 40 will wind counterclockwise and the tape will eject the first article in the channel A which will then strike the delivery plate 42 and turn off the motor.

The articles in the channel B will not move. This is because the tape is effectively anchored at the end of the rail 13 due to differential friction. In other words, the tape has friction bend points at the point 35 at the end of rail 14, points 36 and 37 around the edges of the last box in the channel A, and point 38 at the end of the rail 13. As previously mentioned, the contact between the tape and the rounded ends of the rails provides a definite friction bend. The part of the rail end contacting the tape is stationary and no rollers are used. At each friction bend point there is a definite loss of power analogous to voltage drop in a circuit. This, coupled with the fact that there is a sharp U-bend in the tape at the point 38, effectively anchors the tape at point 38 as long as there are articles in channel A.

However, after all the articles are delivered from channel A the friction bending points 35, 36, and 37 are eliminated and three corresponding friction and bend points are established for the next channel B, and the articles in that channel will then be delivered. This successive power drop caused by the sharp bends of the tape and friction at the bend points may be demonstrated by placing nails on a board and using string or tape in the manner shown in FIGURE 1. Friction bends in rope can withstand a terrific force as is demonstrated by the fact that two turns of a rope around a post can effectively hold a large ship in position.

The tape is preferably of nylon or other equivalent material having good wearing qualities. Metal tape such as stainless steel may be used, but it has a tendency to kink due to the sharp bends and long sitting intervals.

An "Empty" switch 50 is provided. This switch may be a micro switch having an extending arm 51 which rides on top of the tape. The tape is notched as shown at point 52, the position of the notch being chosen so that when all the articles are delivered, the notch 52 will energize the switch arm 51 to prevent starting the motor and light "Empty" indicator light 69.

The motor is adapted to be started by means of a coin operated control 55, FIGURE 5, which may be a conventional device for use in vending machines such as shown in Patents 2,058,637; 2,371,316 and 2,564,552. A number of different articles may be accommodated, each category having its own spool and tape. For instance, four separate items may be mounted in the four channels A, B, C, and D, each having its own motor and tape, as shown in FIGURE 7.

Figure 7:
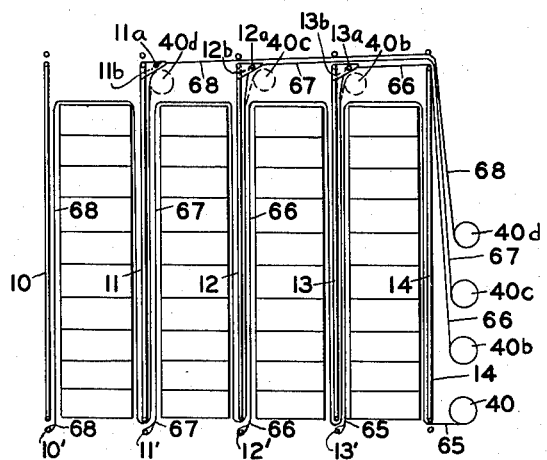

FIGURE 7 shows an arrangement whereby four categories of articles may be delivered from one rack. The four motor driven spools 40, 40b, 40c, and 40d are mounted along one side or along the back of the rack. The tape 65 is attached to the spool 40 and extends around the articles in the channel A, and is anchored to the spacer pin 13' at the end of rail 13. The tape 66 attached to the spool 40b runs around the back of the rail 14, around roller 13a on bracket 13b attached to rail 13, and forwardly between the tape 65 and the rail 13, around the end of the rail 13, back around the articles in channel B, and is anchored to the guide pin 12' at the end of rail 12. Alternatively, the spool 40b could be mounted in the rear of channel A as shown by the dotted lines. The tape 67 attached to the spool 40c extends around the rear of rails 14 and 13, around roller 12a on bracket 12b, forwardly between the rail 12 and tape 66, around the forward end of rail 12, then back and around the packages in the channel C, then forwardly and is anchored to the guide pin 11'. Alternatively, the spool 40c could be mounted at the rear of the channel B as shown by the dotted lines.

The tape 68 attached to the spool 40d extends around the rear of rails 14, 13, and 12, then around roller 11a on bracket 11b, forwardly between the tape 67 and the rail 11, around the forward end of rail 11, then back around the articles in channel D, then forwardly and is anchored to guide pin 10'.

Therefore, the arrangement of the present invention has great flexibility and can accommodate many different categories including different size articles. From one to four different categories may be mounted on the same horizontal rack. Separate motors may be provided for each spool or the different spools may be connected through clutches to the same motor. However, applicant has found it preferable under the refrigerated conditions to use separate motors in order to eliminate parts having reciprocating motion which are liable to stick together, for instance, clutches.

The delivery plate 42 is mounted under the lowest rack so that articles falling from higher racks will strike it. In order to eliminate the slight possibility that boxes would become stuck together, a bridge 60, FIGURE 6, may be mounted on the frame above the end of the rails so that as an article starts to fall from the end of the rail due to the pushing influence of the tape, then the springs 61, 62, etc. bolted to bridge 60 would place a force on the first article which will tend to break it away from any sticking contact with the next article or box. This feature is not necessary for most types of merchandise under average conditions. However, it may be desirable in certain cases where the boxes may become stuck together. The springs connected to the bridge 60 may be quite strong since the tape is capable of exerting considerable force so that there will be sufficient force on the end box to snap it away from the following box under all conditions.

FIGURE 5 shows a schematic diagram for a typical circuit arrangement. The motor 41 is connected to one terminal $T_1$ through a coin-operated control 55 which may be conventional and which remains closed long enough for one cycle of operation. Control 55 is connected in series with a switch 56 which is normally held closed by the spring 57 and which is connected to be opened by the depressing of the delivery plate 42 as the article falls down into the output chute. This switch stops the cycle of operation of the motor. Connected in series with switch 56 is a switch 50 which is spring loaded by the spring 59 against the top of the tape 9. As the last article is delivered, the notch 52 in the tape will come to the switch position and the switch will open. When the switch 50 opens, the line voltage will be impressed across the empty light 69, which may be a neon bulb, and the motor circuit will remain permanently open until the machine is reloaded, thereby moving the notch and the tape away from the switch. The switches 56 and 50 may be conventional of the type commonly referred to as micro switches. The coin-operated control mechanism 55 may be conventional and its specific details are outside the scope of the present invention. However, it should be of the type having a coin collecting holding relay which is adapted to be released by the action of the delivery switch 56 and means to return coins. Conventional apparatus is shown in Patents 2,058,637; 2,371,316 and 2,564,552.

Therefore, the present invention provides dispensing means which are simple and have a minimum number of moving parts. The present invention is particularly adaptable for high humidity, low temperature, conditions since all reciprocating motion parts which are liable to stick together have been eliminated. The motor is preferably of the type having a sealed casing so that there are no complicated mechanical movements which are exposed to icing conditions. Due to the small number of moving parts, the apparatus is easily and inexpensively maintained.

Various modifications will occur to those desiring to practice the invention. For instance, various other materials may be used for the tape, or the control circuit and spool arrangements may be specifically different. None of these modifications depart from the scope of the invention which is defined by the appended claims.

I claim:

1. In a refrigerator, dispensing means for refrigerated articles which may be stuck together, comprising a horizontal frame, a plurality of straight horizontal parallel rails forming channels on said frame to receive respective stacks of said articles, a tape anchored at one end to the front end of a first of said rails and extending along said rail into a first said channel and around articles in said first channel, said tape then making a sharp bend around the front end of a second of said rails and extending around articles in a second channel, said tape then bending around the front end of a third of said rails, guide pins at the front ends of said rails, said tape passing between said rail ends and said guide pins, a drivable spool connected to the other end of said tape, said bendings around the ends of said rails providing friction power losses whereby all articles in said second channel will be ejected before articles in said first channel will be moved, said channels being open at the front end, a bridge extending across the open ends of said channels, and means for breaking apart at time of delivery articles which are frozen together comprising a plurality of springs on said bridge, said springs having operative ends extending beyond the front end of said frame in position to engage and exert a downward force on an article pushed past the front end of said frame, said springs and the pulling force on said tape being sufficiently strong to break apart articles frozen together, and delivery chute means mounted under said open ends of said channels.

2. In a refrigerator, dispensing means for refrigerated articles which may be stuck together, comprising a horizontal frame, a plurality of straight horizontal parallel rails forming a plurality of channels on said frame to receive respective stacks of different categories of said articles, a plurality of tapes each anchored at one end to the frame at the front end of one of said channels and each tape extending into one of said channels and around articles in that channel, a plurality of drivable spools each connected to the other end of one of said tapes whereby different categories of articles may be delivered from the same horizontal frame, said channels being open at the front end, a bridge extending across the open ends of said channels, and means for breaking apart at time of delivery articles which are frozen together comprising a plurality of springs on said bridge, said springs having operative ends extending beyond the front end of said frame in position to engage and exert a downward force on an article pushed past the front end of said frame, said springs and the pulling force on the respective tape being sufficiently strong to break apart articles frozen together, and delivery chute means mounted under said open ends of said channels.

References Cited in the file of this patent

UNITED STATES PATENTS

| | | |
|---|---|---|
| Re.21,805 | Greaves | May 20, 1941 |
| 622,932 | Tribble | Apr. 11, 1899 |
| 890,936 | Sandell | June 16, 1908 |
| 1,718,572 | Marcuse | June 25, 1929 |
| 1,865,232 | Butler | June 28, 1932 |
| 2,353,394 | Farmer | July 11, 1944 |
| 2,360,241 | Kuhl | Oct. 10, 1944 |
| 2,398,639 | Heyer | Apr. 16, 1946 |
| 2,425,870 | Dixon | Aug. 19, 1947 |
| 2,441,519 | Terhune | May 11, 1948 |
| 2,446,788 | Rifkin | Aug. 10, 1948 |
| 2,500,437 | Tandler et al. | Mar. 14, 1950 |
| 2,564,552 | Verdery | Aug. 14, 1951 |
| 2,569,798 | Carroll | Oct. 2, 1951 |
| 2,586,351 | Larimore | Feb. 19, 1952 |
| 2,590,736 | Tandler et al. | Mar. 25, 1952 |
| 2,598,156 | Brill et al. | May 27, 1952 |